United States Patent [19]

Preston, Jr.

[11] Patent Number: 4,667,295
[45] Date of Patent: May 19, 1987

[54] LOGICAL TRANSFORM IMAGE PROCESSOR

[76] Inventor: Kendall Preston, Jr., 5701 E. Glenn St., Bld. 36, Tucson, Ariz. 85712

[21] Appl. No.: 790,782

[22] Filed: Oct. 18, 1985

Related U.S. Application Data

[63] Continuation of Ser. No. 451,832, Dec. 21, 1985, abandoned.

[51] Int. Cl.⁴ .................. G06F 16/40; G06F 9/56
[52] U.S. Cl. .................................. 364/518; 364/521; 382/27; 382/41
[58] Field of Search .................. 364/518, 521; 382/27, 382/41, 49

[56] References Cited

U.S. PATENT DOCUMENTS

| | | | |
|---|---|---|---|
| 3,849,760 | 11/1974 | Endoll et al. | 382/41 |
| 4,224,600 | 9/1980 | Sellner | 382/41 |
| 4,290,049 | 9/1981 | Sternberg et al. | 382/49 |
| 4,301,443 | 11/1981 | Sternberg et al. | 382/49 |
| 4,369,430 | 1/1983 | Sternberg | 382/27 |
| 4,393,453 | 7/1983 | Nakano | 382/41 X |
| 4,395,698 | 7/1983 | Sternberg et al. | 382/41 X |
| 4,464,789 | 8/1984 | Sternberg | 382/49 X |
| 4,484,349 | 11/1984 | McCubbrey | 382/41 X |

*Primary Examiner*—Errol A. Krass
*Assistant Examiner*—Kevin J. Teska
*Attorney, Agent, or Firm*—Harry M. Weiss

[57] ABSTRACT

A minicomputer provides signals representative of an image to three memory units via a sixteen bit data bus. Signals representative of sixteen central pixels of the image and neighbors thereof are provided from the memory units to a tessellation memory. In response to the central pixels and their neighbors forming a predetermined pattern, signals representative of the central pixels may be altered, whereby the central pixels are processed simultaneously. Signals representative of the processed central pixels are provided to the minicomputer via the data bus.

19 Claims, 2 Drawing Figures

LOGICAL TRANSFORM IMAGE PROCESSOR

This application is a continuation of application Ser. No. 451,832, filed Dec. 21, 1982 now abandoned.

BACKGROUND OF THE INVENTION

1. Field of the Invention

This invention relates generally to Logical Transform Processors, and more specifically to a Logical Transform Processor that performs a plurality of related transformations simultaneously.

2. Description of the Prior Art

An unprocessed image, derived from objects on the surface of the earth by a satellite camera, from objects in a histological section by a digital microscope or derived in any other manner, is often enhanced by computer processing. The enhancement may be used for clarification where, for example, a computer processor determines, from a signal representation of the unprocessed image, portions thereof that are relevant. Based upon the determination, the processor provides a signal representation of the relevant portions.

The unprocessed image is comprised of a multiplicity o least resolvable elements, known as pixels. A pixel is either black or white. A signal representation of the pixel is usually either a logic "1" signal or a logic "0" signal when the pixel is either black or white, respectively. Accordingly, the signal representation of the unprocessed image is comprised of signals representative of all of the pixels of the unprocessed image.

The processing of the pixel is usually equivalent to comparing an array formed by the pixel and pixels proximal thereto (referred to as neighbors hereinafter) to all possible arrays. Based upon the comparison, the pixel is, for example, either included as a black element or a white element of a processed image.

One type of array, known as a square tessellation, includes the pixel at the center of an imaginary square. A neighborhood of the square tessellation is comprised of pixels respectively located at the corners of the square and at the midpoints of lines comprising the square.

Another type of array, known as a hexagonal tessellation, includes the pixel at the center of an imaginary hexagon. A neighborhood of the hexagonal tessellation is comprised of pixels at the corners of the hexagon.

The processing of image fields has been described in detail in U.S. Pat. No. 4,060,713 by M. J. E. Golay.

The processor may easily serially process the signal representation of the unprocessed image. Signals representative of the pixel and its neighbors are fetched from a memory element of the processor. The fetched signals are compared to groups of signals respectively representative of all possible combinations of the pixel and its neighbors. Based upon the comparison, the signal representative of the pixel may be altered, whereby the pixel is processed. After the pixel is processed, a signal representation of the processed pixel and its neighbors are returned to the memory for storage.

Hence, there is a fetch, comparison and storage needed for each pixel of the unprocessed image. It should be appreciated that an unprocessed television image typically is a 512 by 512 array of pixels. Accordingly, the serial processing of the unprocessed television image consumes a large amount of computation time.

The processor usually includes a minicomputer which utilizes a sixteen bit word. In other words, the minicomputer can simultaneously provide sixteen signals respectively representative of sixteen pixels. Heretofore, the signals representative of the sixteen pixels could not be readily processed when the pixel is included in one of several possible tessellations. That is to say, it is difficult to program the processor to readily process one image that includes, for example, pixels in the square tessellation and then another image that includes pixels in the hexagonal tessellation.

SUMMARY OF THE INVENTION

An object of the present invention is to rapidly process a signal representation of an unprocessed image.

According to the present invention, a selected number of tessellation memory elements are programmed by a minicomputer to provide a signal to said minicomputer in response to an address code representative of a pixel and its neighbors defining a selected pattern; a plurality of image memory units are respectively loaded by said computer with a plurality of signal representations of an unprocessed image; an address code representative of the selected number of pixels and their neighborhoods are provided by said image memory units to said tessellation memory.

Apparatus of the present invention is economical to construct and operate in conjunction with a minicomputer to rapidly process a signal representation of an image.

The foregoing and other objects, features and advantages of the invention will be apparent from the following, more particular description of the preferred embodiment of the invention, as illustrated in the accompanying drawing.

DESCRIPTION OF THE PREFERRED EMBODIMENT

An important form of image enhancement is known as skeletonizing. In the preferred embodiment, the teachings of the present invention are exemplified by a skeletonizing process that includes elimination of the boundaries of objects in an unprocessed image to provide a skeletonized image where the objects have no boundaries.

Figure 2:
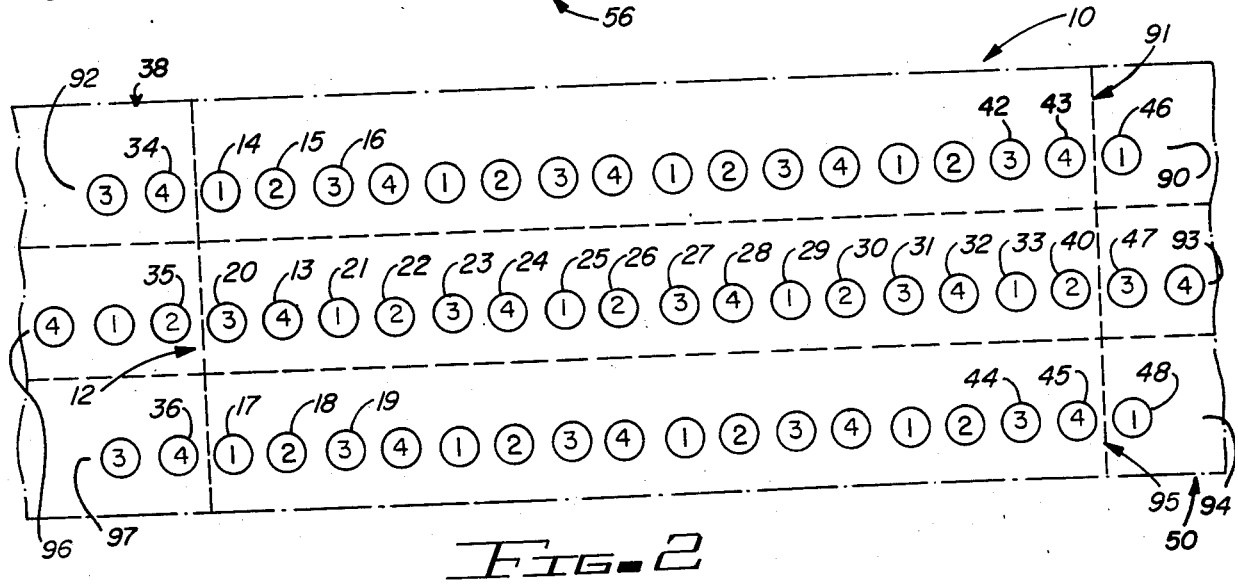
FIG. 2 is a pictorial representation of pixels of an unprocessed image.

As shown in FIG. 2, an unprocessed image includes a multiplicity of pixels divided into four subfields. Pixels of a first, second, third and fourth subfields are noted with a numeral one, two, three and four, respectively.

The pixels are divided into the subfields because, in the skeletonizing process, the subfields are processed one subfield at a time. Without the one subfield at a time processing, the skeletonizing could provide an image where an object is entirely eliminated, rather than skeletonized. Subfields are often utilized in image enhancement processes other than skeletonizing.

A group 10 of forty eight of the pixels, is represented in this embodiment by three 16 bit words. One of the words represents a row 12 of the group 10. Two of the 16 bit words within the group 10 are described hereinafter.

A pixel 13 of the row 12 has a neighborhood comprised of pixels 14–21. Accordingly, the pixel 13 has eight neighbors. The pixels 14, 16, 17, 19 are, at least conceptually, disposed at the corners of a square. The pixels 15, 18, 20, 21 are disposed at the midpoints of lines comprising the square. Hence, the pixel 13 is a central pixel in a square tessellation. In a similar manner, within the row 12 pixels 21-33 are central pixels in square tessellations. In this embodiment a pixel is processed by evaluating a square tessellation wherein the pixel is centrally located.

The pixel 20 is a central pixel with neighbors comprised of pixels 13-15, 17, 18, 34-36. It should be understood that pixels 34-36 are within a group 38, similar to the group 10.

In a similar manner, a pixel 40 of the group 10 is a central pixel with neighbors comprised of pixels 33, 42-45 within the group 10 and pixels 46-48 within a group 50. The group 50 is similar to the groups 10, 38.

As explained hereinafter, a row of pixels of the group 50, substantially colinear with the row 12, are processed prior to processing of the row 12. Because of the processing of the row of pixels of the group 50, logic signals representative of the pixels 46-48 are stored and available for use in processing the pixel 40. The pixel 40 is processed when all other pixels of the row 12 are processed.

Similarly, logic signals representative of the group 38 are stored in three memory registers when the row 12 is processed, whereby logic signals representative of the pixels 34-36 are available for use in processing of the pixel 20. The pixel 20 is processed when all other pixels of the row 12 are processed.

It should be understood that a central pixel is on a boundary when it is black and its neighbors include two non-adjacent groups of black pixels. When, for example, the pixels 13, 14, 16 are black and the pixels 17-19, 20, 21 are white, the pixel 13 is on a boundary. In accordance with the skeletonizing process, the pixel 13 is changed from black to white. More particularly the image processor alters a signal representation of the pixel 13 from a logic '1' signal to a logic '0' signal.

Figure 1:
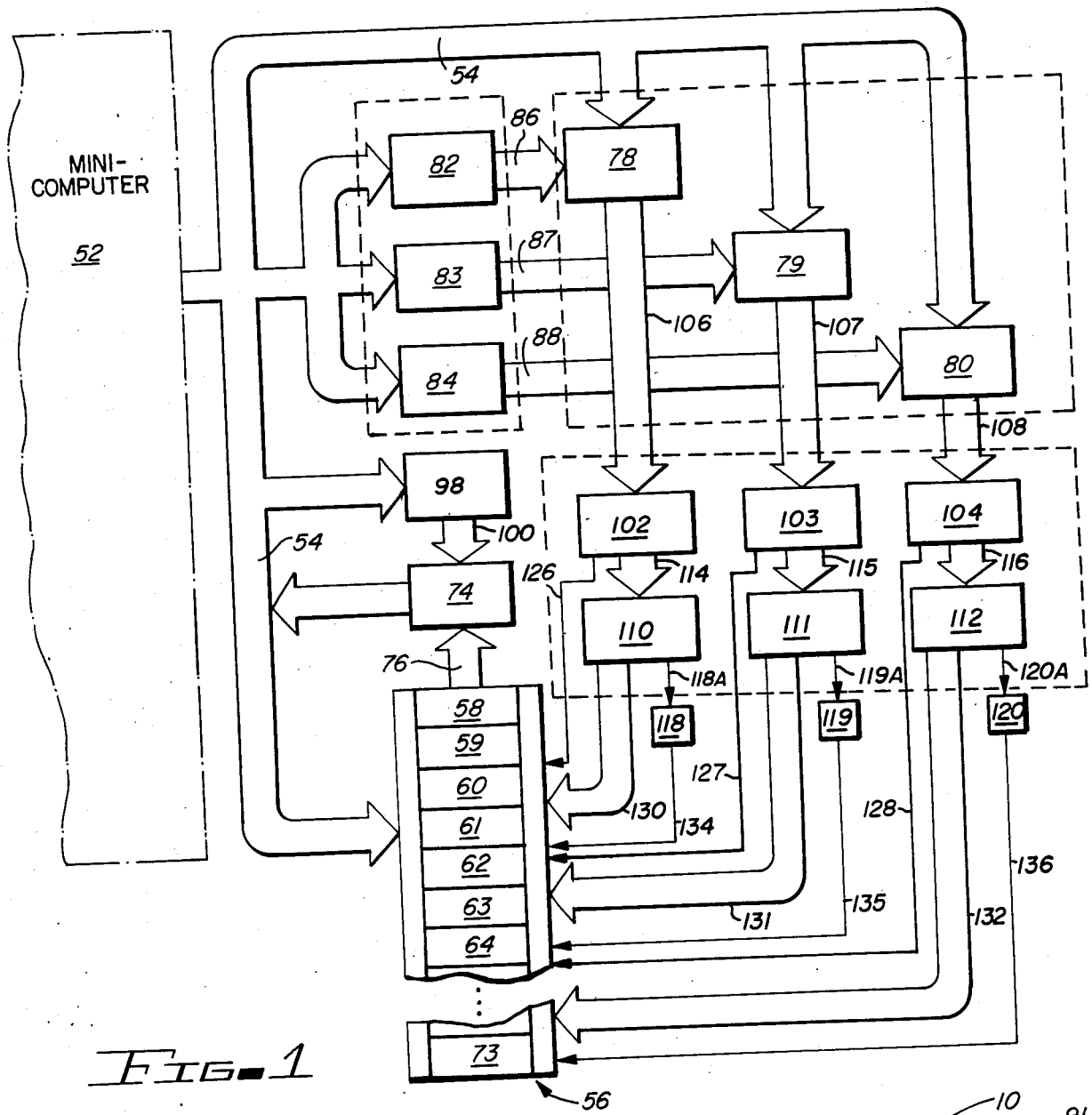
FIG. 1 is a block diagram of the preferred embodiment of the present invention.

As shown in FIG. 1, a computer image processor includes a minicomputer 52 of a type that utilizes a 16 bit word. The minicomputer 52 has what is known as a sixteen bit data bus 54. The data bus 54 is an equivalent of sixteen signal lines. Moreover the data bus 54 is time-shared by circuit elements of the image processor external to the minicomputer 52 whereby at one given time signals are provided from the minicomputer 52 to one of the circuit elements and at another given time to another of the circuit elements. In a similar manner signals are provided by the circuit elements to the minicomputer 52 through the data bus 54. Time sharing of a data bus is well known.

In addition to the data bus 54, other enable lines and clock signal lines connect the minicomputer 52 to the circuit elements. These lines are not shown in order to present the teachings of the present invention without unnecessary details that could be confusing.

The circuit elements include a tessellation memory 56 which is comprised of sixteen similar random access (RAM) memories 58-73 of any suitable well known type. The memories 58-73 each have nine input address lines (not shown) that receive logic signals collectively known as an address code. An address code is representative of a central pixel and its eight neighbors. Additionally, the RAM memories 58-73 respectively provide sixteen logic signals to a subfield gate 74 (explained hereinafter) via sixteen signal lines 76.

In an initialization of the processor, the memory 56 is loaded by the computer 52 via the data bus 54 to cause each of the RAM memories 58-73 to provide to the subfield gate 74 a logic "1" signal in response to an address code representative of a central pixel being on the boundary of any object in the unprocessed image. The provision of address codes to the memory 56 is described hereinafter.

The initialization of the processor additionally includes loading a signal representation of all, or a desired portion, of the unprocessed image into three similar random access image memory units 78-80. In this embodiment, a signal representation of the sixteen pixels of a row 90 of the group 50 (FIG. 2), is provided by the minicomputer 52 to the memory units 78-80 via the data bus 54. Additionally, a first image code, representative of a first image code number, one, is loaded into counters 82-84 from the minicomputer 52 via the data bus 54. The counters 82-84 provide the first image code to the memory units 78-80 through signal lines 86-88, respectively. The minicomputer 52 provides a write signal via a signal line (not shown) to the memory units 78-80. In response to the signal representation of the row 90, the first image code, and the write signal, the signal representation of the row 90 is stored in the memory units 78-80 at respective memory locations that correspond to the number, one.

After the storage of the signal representation of the row 90, the minicomputer 52 provides a count signal via a signal line (not shown) to the counters 82-84. In response to the count signal, the counters 82-84 are incremented, whereby a second image code, representative of the number, two, is provided to the memory units 78-80. Additionally, a signal representation of a row 91 of the group 10 is provided to the memory units 78-80 by the minicomputer 52. The minicomputer 52 provides the write signal, whereby the signal representation of the row 91 is stored in the memory units 78-80 are respective memory locations that correspond to the number, two, in a manner similar to the storage of the signal representation of the row 90.

In a similar manner, a signal representation of a row 92 of the group 38 and signal representations of pixels in rows substantially colinear with the row 90-92 are stored in the memory units 78-80. Correspondingly, signal representations of all other colinear rows of pixels are successively stored whereby the signal representation of all, or the desired portion, of the unprocessed image is stored.

The initializing of the processor further includes storing in a subfield mask 98 subfield signals provided by the minicomputer 52 through the data bus 54. The subfield signals are a representation of the subfield that is being processed.

The subfield mask 98 is comprised of sixteen bistable latches, but may alternatively be comprised of any other suitable memory elements. When, for example, pixels of the first subfield included in the row 12 are processed, a selected four of the latches store a logic '1' signal; all others store a logic '0' signal, whereby the subfield signals are stored.

The output of the subfield mask 98 is connected to the subfield gate 74 through a plurality of signal lines 100. When, for example, pixels of the first subfield included in the row 12 are processed, signals respectively representative of processed pixels of the row 12 are provided by the memory 56 to the subfield gate 74. Because of the stored subfield signals, only processed pixels of the first subfield pass through the subfield gate 74 to the minicomputer 52 via the data bus 54. Pixels of the other subfields included in the row 12 pass unprocessed from the memory 56 through the subfield gate 74.

The initializing of the processor is completed when the counters 82-84 are loaded with a first three image codes that respectively correspond to memory locations where the signal representation of the row 90, and signal representations of rows 93, 94 of the group 50 are stored. Thereafter, a first fetch signal is provided simultaneously to the memory units 78-80. In response to the first fetch signal and the first three image codes, the signal representations of the rows 90, 93, 94 are respectively provided by the memory units 78-80 to memory registers 102-104 through groups of signal lines 106-108. The signal representations of the rows 90, 93, 94 are stored in the registers 102-104, respectively.

Since each of the rows 90, 93, 94 has sixteen pixels, the groups 106-108 each number sixteen lines. Therefore circuit elements of the image processor external to the minicomputer 52 have an equivalent of a forty eight bit data bus, thereby providing for rapid processing in a manner made apparent hereinafter.

After the first fetch signal is provided, the counters 82-84 are incremented by the count signal. Because of the loading of the memory units 78-80 described hereinbefore, the incrementing after the first fetch signal causes the counters 82-84 to provide a second three image codes that respectively correspond to memory locations where the signal representations of the rows 91, 12 and a signal representation of a row 95 of the group 10 are stored. Additionally, the signal representations of the rows 90, 93, 94 are transferred to memory registers 110-112 through groups of signal lines 114-116, respectively, in response to a transfer signal that is provided in any suitable manner.

A second fetch signal, similar to the first fetch signal, is provided simultaneously to the memory units 78-80. In response to the second fetch signal and the second three image codes, the signal representations of the rows 91, 12 and a row 95 of the group 10 are provided by the memory units 78-80 to the registers 102-104, respectively, and stored, therein. Pixels of a selected subfield in the row 93 are then processed in a manner similar to the processing of a selected subfield in a row 12 described hereinafter.

The processing of the selected subfield in the row 93 is followed by the transfer signal being applied to the registers 110-112 and the registers 102-104. In response to the transfer signal, there is a transfer of the signal representations of the pixels 46-48 from the register 110-112 to storage registers 118120 through signal lines 118A-120A, respectively. Additionally, the signal representations of the rows 91, 12, 95 are stored in the registers 110-112, respectively.

After the second fetch signal, the counters 82-84 are incremented by the count signal. The incrementing causes the counters 82-84 to provide a third three image codes that respectively correspond to memory locations where the signal representation of the row 92 and signal representations of rows 96, 97 of the group 38 are stored. A third fetch signal, similar to the first fetch signal, is provided simultaneously to the memory units 78-80. In response to the third fetch signal and the third three image codes, the signal representations of rows 92, 96, 97 are provided by the memory units 78-80 to the registers 102-104 and stored therein.

In summary when the row 12 is processed, the signal representations of the rows 91, 12, 95 are respectively stored in the registers 110-112, the signal representations of the rows 92, 96, 97 are respectively stored in the registers 102-104 and the signal representations of the pixels 46-48 are respectively stored in the registers 118-120.

The registers 102-104 are connected to the memory 56 through signal lines 126-128, whereby signal representations of the pixels 34-36 are provided to the memory 56. Additionally, the registers 110-112 are connected to the memory 56 through groups of signal lines 130-132, whereby the signal representations of the rows 91, 12, 95 are provided to the memory 56. It should be understood that the groups 130-132 each number sixteen lines.

The registers 118-120 are connected to the memory 56 through signal lines 134-136, respectively, whereby the signal representations of the pixels 46-48 are provided to the memory 56. Accordingly, signal representations of all pixels needed to simultaneously process all pixels of the row 12 are provided to the memory 56 through fifty four signal lines. Therefore, circuit elements of the image processor external to the minicomputer 52 have an equivalent of a 54 bit data bus. Because of the equivalent of the 48 bit data bus referred to hereinbefore and the equivalent of the 54 bit data bus, sixteen pixels are simultaneously processed. When the row 12 is processed, signal representations of processed pixels 13, 20-33, 40 pass to the subfield gate 74 as described hereinbefore.

When, for example, all of the pixels of the first subfield are processed, the minicomputer 52 has stored therein a partially processed image. Pixels of the other subfields of the partially processed image are processed in a similar manner. The processing is iterated until no signal representation of a pixel is altered from a '1' to a '0', whereby the minicomputer 52 stores the signal representation of a skeletonized image.

It should be appreciated that the present invention is applicable to a multiplicity of other applications other than skeletonizing. By selecting what is stored in the memory 56, the invention is, for example, useable for boundary detection, area measurement, object counting, translation and rotation of an image, a complementation type of inversion, high pass filtering and low pass filtering.

While the invention has been particularly shown and described with reference to a preferred embodiment thereof, it should be understood by those skilled in the art that changes in form and detail may be made therein without departing from the spirit and scope of the invention.

What is claimed is:

1. A logical transform image processor, comprising:
   computer means for storing and providing unaltered signal representations of pixels of an image via a data bus;
   memory means, coupled to said data bus, for storing a plurality of substantially identical copies of said unaltered signal representations of said image;
   tessellation means, coupled to said data bus and said memory means, for simultaneously providing altered signal representations of a pre-established group of pixels in response to unaltered signal representations of said pre-established group of pixels and pixels having a pre-selected geometric relationship with each of said pre-established groups of pixels, said altered signal representations being provided to said computer means via said data bus.

2. The logical transform processor of claim 1 wherein said pre-established group of pixels are equal in number to the number of bits of said data bus.

3. The logical transform processor of claim 1 wherein said memory means provides said unaltered signal representations and a signal representation of said pre-selected pixels to said tessellation means in response to an address code.

4. The logic transform processor of claim 1 wherein said pre-selected pixels are determined in accordance with a loading of said tesselation means by said computer means via said data bus.

5. The logical transform processor of claim 1 additionally comprising subfield means coupled to said tessellation means of said group for providing selected portions of said altered and unaltered signal representations of said pre-established group to said computer means.

6. In the method of processing of a signal representation of an image, the steps of:
providing an unaltered signal representation of pixels of an image from a computer to a plurality of memory units via a data bus;
fetching from said memory units signal representations of a selected number of central pixels and their neighbors;
generating an address code representative of groups of pixels in a known tessellation;
simultaneously addressing a storage unit associated with each central pixel by said signal representations, said address code determining a location in said associated storage unit;
simultaneously altering a signal representation of each central pixel with a signal representation stored at said addressed associated storage unit location; and
simultaneously providing said altered signal representation of each central pixel to said computer via said data bus.

7. The method of claim 6 wherein said selected number equals the number of bits of said data bus.

8. The method of processing a signal representation of claim 6 further comprising the step of masking pre-selected altered signal representations from said computer.

9. A logical transform image processor for processing a selected group of image pixel logic signals comprising:
a plurality of memory units, each of said memory units storing logic signals representing image pixels;
register means associated with each of said memory units for storing pre-selected logic signals of said image pixels, said pre-selected image pixel logic signals including said group of image pixel logic signals and associated neighbor image pixel logic signals, said neighbor image pixel logic signals have a pre-determined relationship with said associated image pixel logic signal group;
a plurality of addressable storage means addressed in parallel by said register means, each of said storage means associated with a one of said group of image pixel logic signals and associated neighbor image pixel logic signals, said storage means for providing an output logic signal determined by address signals applied thereto, wherein said address signals for each of said storage means are said associated group and neighbor image pixel logic signals, each of said group and neighbor image logic signals sets addressing a pre-determined storage means location, wherein said pre-determined storage means location stores a transform image pixel logic signal.

10. The logical transform processor of claim 9 further comprising sub-field means for selecting for each of said storage means said output signal or said associated logic signal.

11. A logical transform image processor comprising:
memory means for storing logic signals representing an image;
first register means coupled to said storage means for storing a pre-selected group logic signal, said pre-selected group of logic signals including logic signals of pixels to be transformed by said image processor;
at least one second register means for storing a group of image logic signals having a pre-determined relationship with said pixel logic signals to be transformed by said image processors; and
addressable storage means coupled to said first register means and said at least one second register means for substantially simultaneously providing a transformed image logic signal for each of said pixels in said first register means.

12. The logical transform image processor of claim 11 wherein said at least one second register means comprises two third register means, said two third register means storing pixel logic signals associated with said group of logic signal pixels at associated register positions.

13. The logical transform image processor of claim 12 wherein said memory means includes three memory units, each of said three memory units storing logical signals representing an image to be transformed, each of said memory units associated with a one of said first register means and said two second register means.

14. The logical transform image processor of claim 13 wherein logic signals can be transferred essentially simultaneously from said three memory units to said associated first and two second register means.

15. The logical transform image processor of claim 13 further comprising counter means coupled to each of said memory units, said counter means for determining an image width to be processed by said logical transform image processor.

16. A logical transform image processor comprising:
computer means for storing and providing unaltered signal representations of pixels of an image via a data bus;
memory means, coupled to said data bus, for storing three substantially identical signal representations of said image;
tessellation means, coupled to said data bus and said memory means, for simultaneously providing altered signal representations of a pre-established group of pixels in response to unaltered signal representations of said pre-established group of pixels and pixels having a pre-selected geometric relationship with each of said pre-established groups of pixels, said altered signal representations being provided to said computer means via said data bus.

17. The logical transform image processor of claim 16 further including counter means for determining said pre-established group of pixels.

18. The logical transform image processor of claim 17 wherein said tessellation means include the three register means, wherein signal representation can be transferred from said means to said three register means essentially simultaneously.

19. The logical transform image processor of claim 18 wherein said counters can be programmed to control a width of an image field being processed.

* * * * *